United States Patent
Tsuzuki et al.

(10) Patent No.: US 6,838,974 B2
(45) Date of Patent: Jan. 4, 2005

(54) SECURITY SYSTEM

(75) Inventors: Kazuhisa Tsuzuki, Secaucus, NJ (US); Motohiro Misawa, Yokohama (JP); Tooru Toyoda, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 245 days.

(21) Appl. No.: 09/748,162

(22) Filed: Dec. 27, 2000

(65) Prior Publication Data

US 2001/0005169 A1 Jun. 28, 2001

(30) Foreign Application Priority Data

Dec. 28, 1999 (JP) .............................. 11-372802
Dec. 1, 2000 (JP) ........................ 2000-367571

(51) Int. Cl.[7] ............................................. G05B 19/00
(52) U.S. Cl. ...................... 340/5.5; 340/506; 340/522; 340/5.8; 340/538; 340/288; 340/286.02
(58) Field of Search ...................... 340/5.5, 5.7, 5.8, 340/825.36, 286.02, 288, 506, 517, 522, 538, 3.1; 348/159

(56) References Cited

U.S. PATENT DOCUMENTS 4,543,574 A * 9/1985 Takagi et al. ............. 340/825.5
4,721,954 A * 1/1988 Mauch ................... 340/825.31
5,809,027 A * 9/1998 Kim et al. .................... 370/451
6,483,847 B1 * 11/2002 Ross ........................... 370/445

FOREIGN PATENT DOCUMENTS

JP           8-305610        11/1996

* cited by examiner

*Primary Examiner*—Michael Horabik
*Assistant Examiner*—Vernal Brown
(74) *Attorney, Agent, or Firm*—Louis Woo

(57) ABSTRACT

Plural security units are coupled to plural control units through a communication line including transmission and response lines. Each control unit detects data collision on the transmission line to avoid the data collision. Re-transmission interval is independently assigned to each control unit. If the command to or from a security unit in charge of this control unit is received, the control unit rewrites the conditional data of the security unit in accordance with the detected command. The control (security) unit further includes a transmission (response) line monitoring portion, so that bi-directional communication is provided in addition of the response (transmission) line monitoring portion. Address data is classified to provide all unit communication, a group communication, and independent communications.

7 Claims, 10 Drawing Sheets

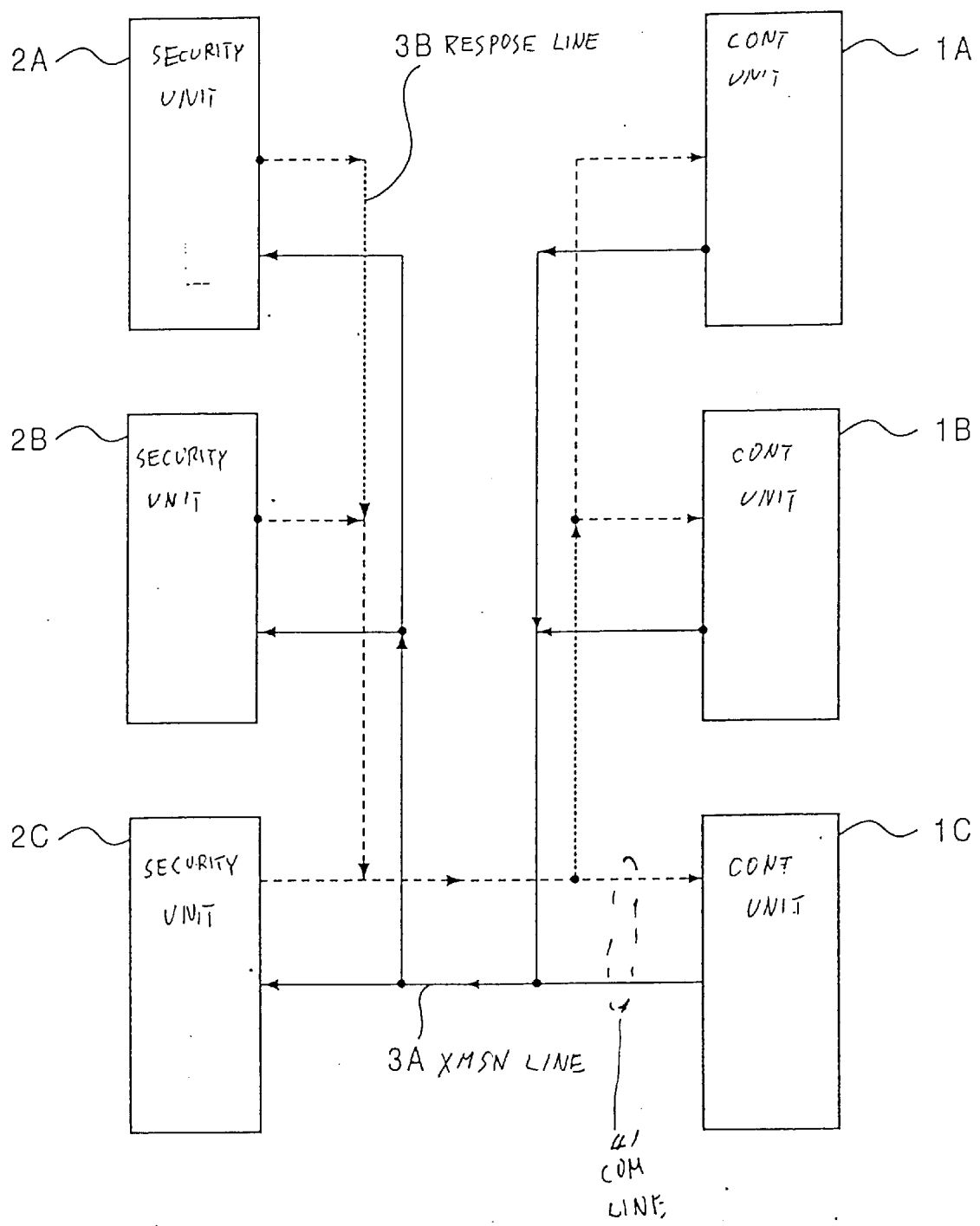

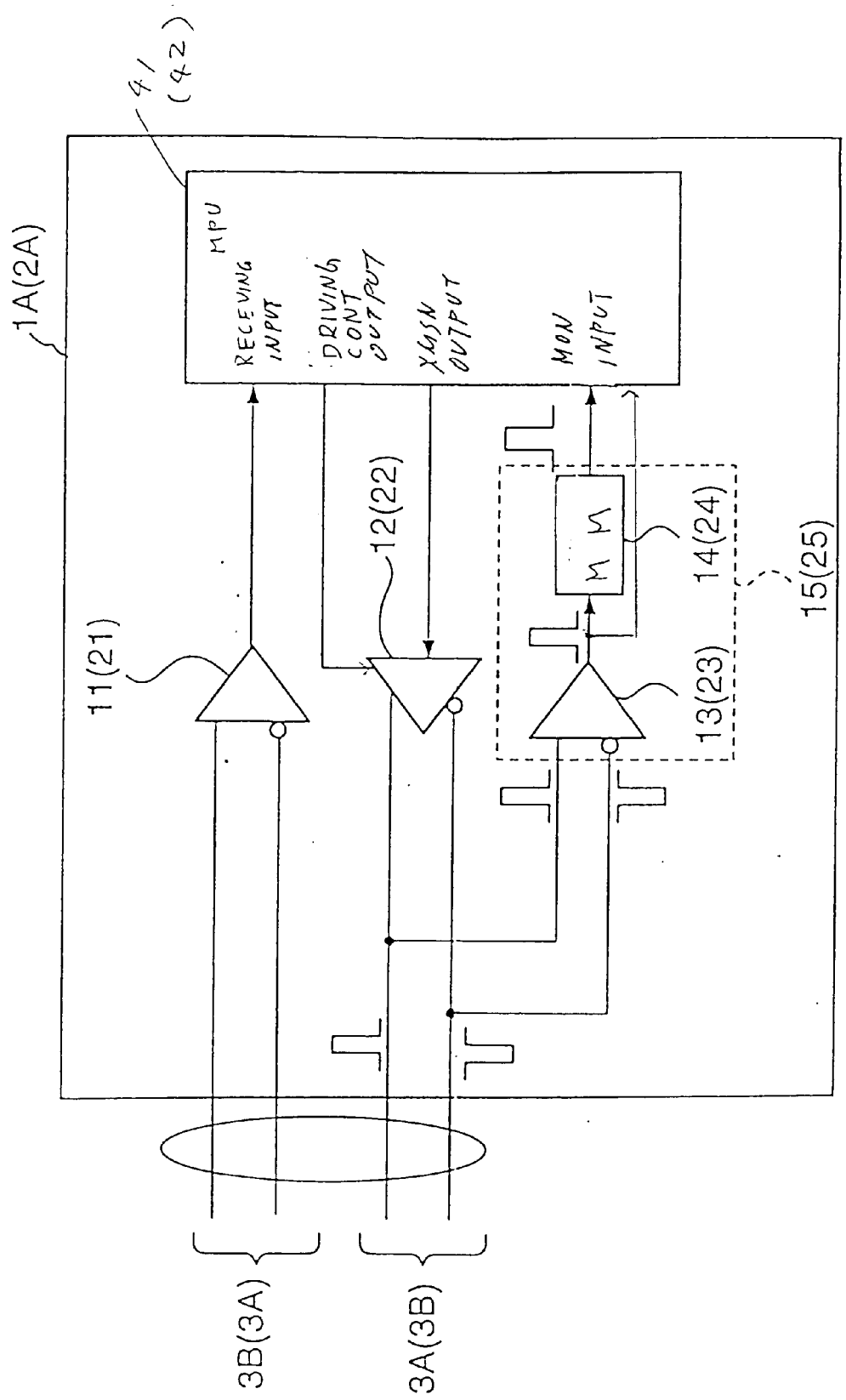

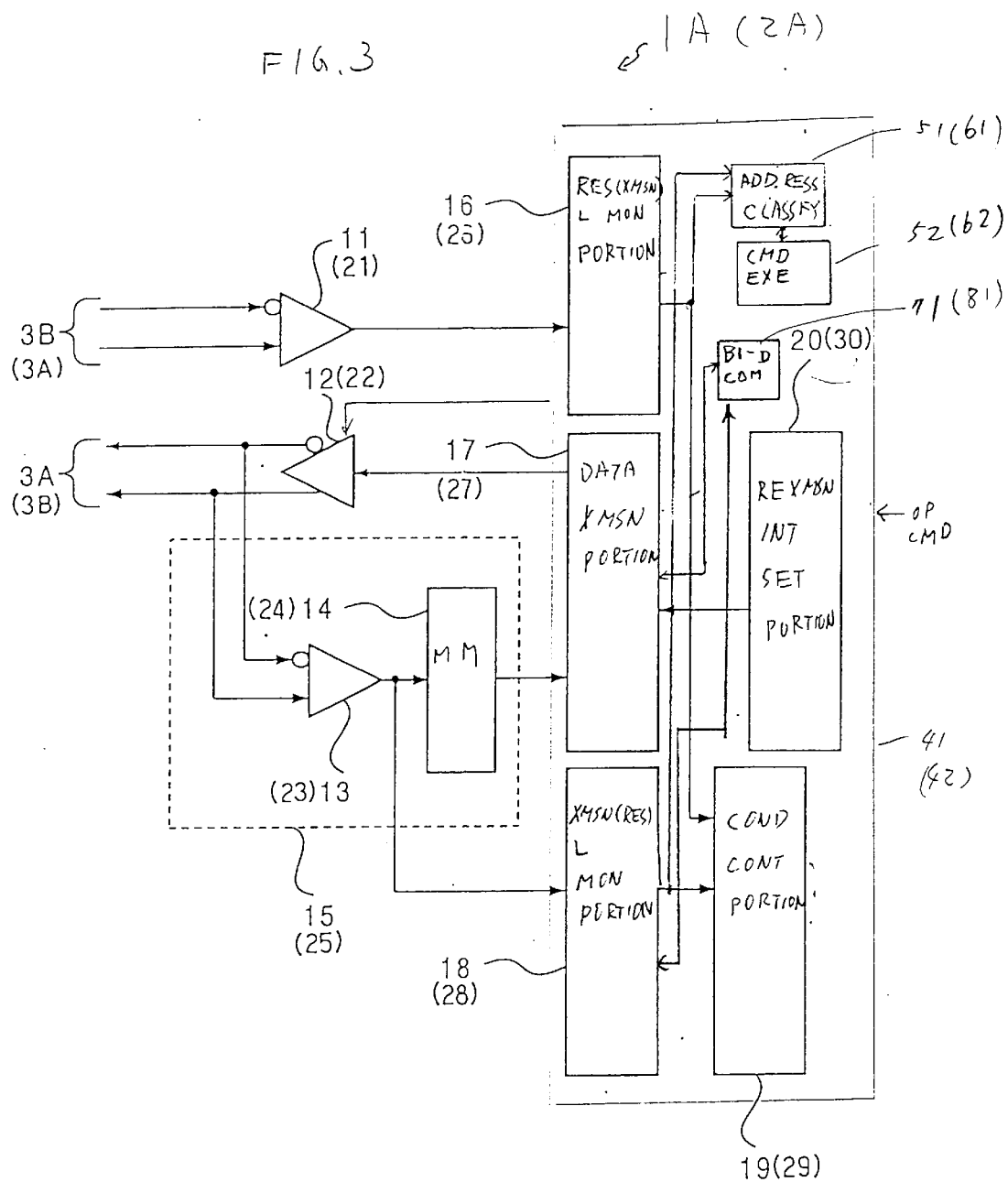

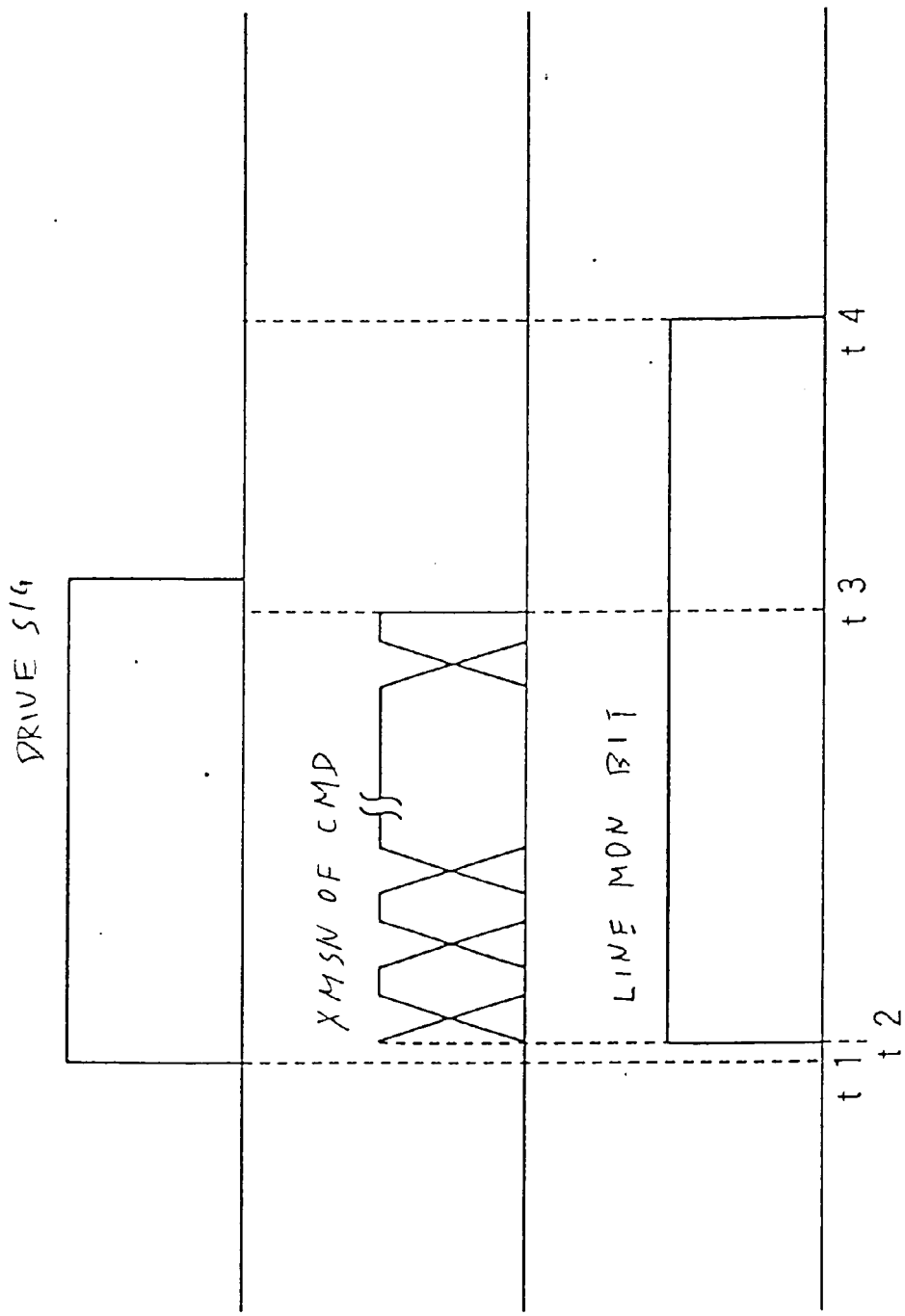

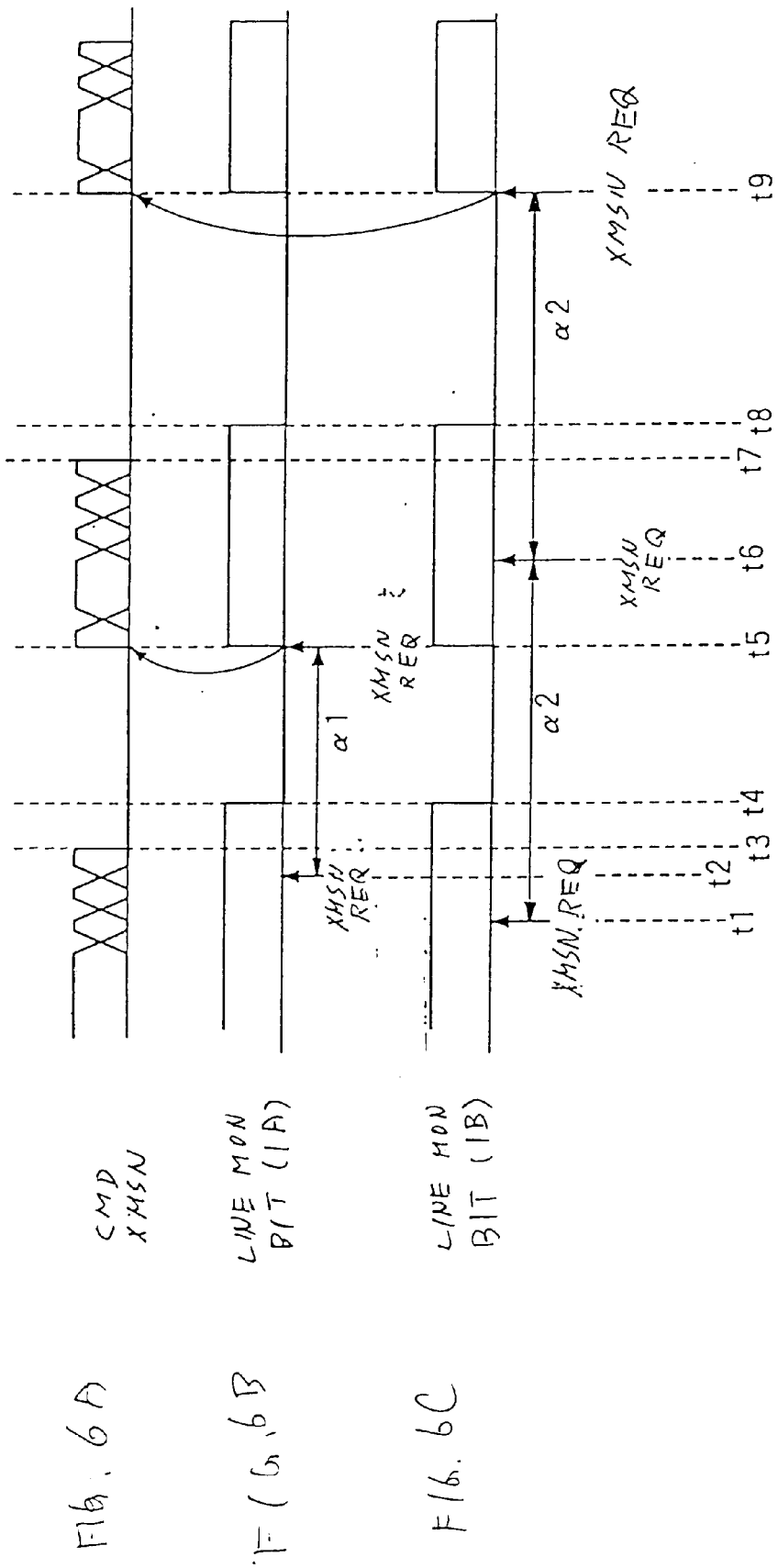

FIG. 7

| ADRESS (L·SD) | α (ms) | |
| --- | --- | --- |
| | INTERNAL TIMER | V SYNC |
| 1 | 0ms | 0V SYNC |
| 2 | 5ms | 1V SYNC |
| 3 | 10ms | 2V SYNC |
| 4 | 15ms | 3V SYNC |
| 5 | 20ms | 4V SYNC |
| 6 | 25ms | 5V SYNC |
| 7 | 30ms | 6V SYNC |
| 8 | 35ms | 7V SYNC |
| 9 | 40ms | 8V SYNC |
| 0 | 42ms | 9V SYNC |

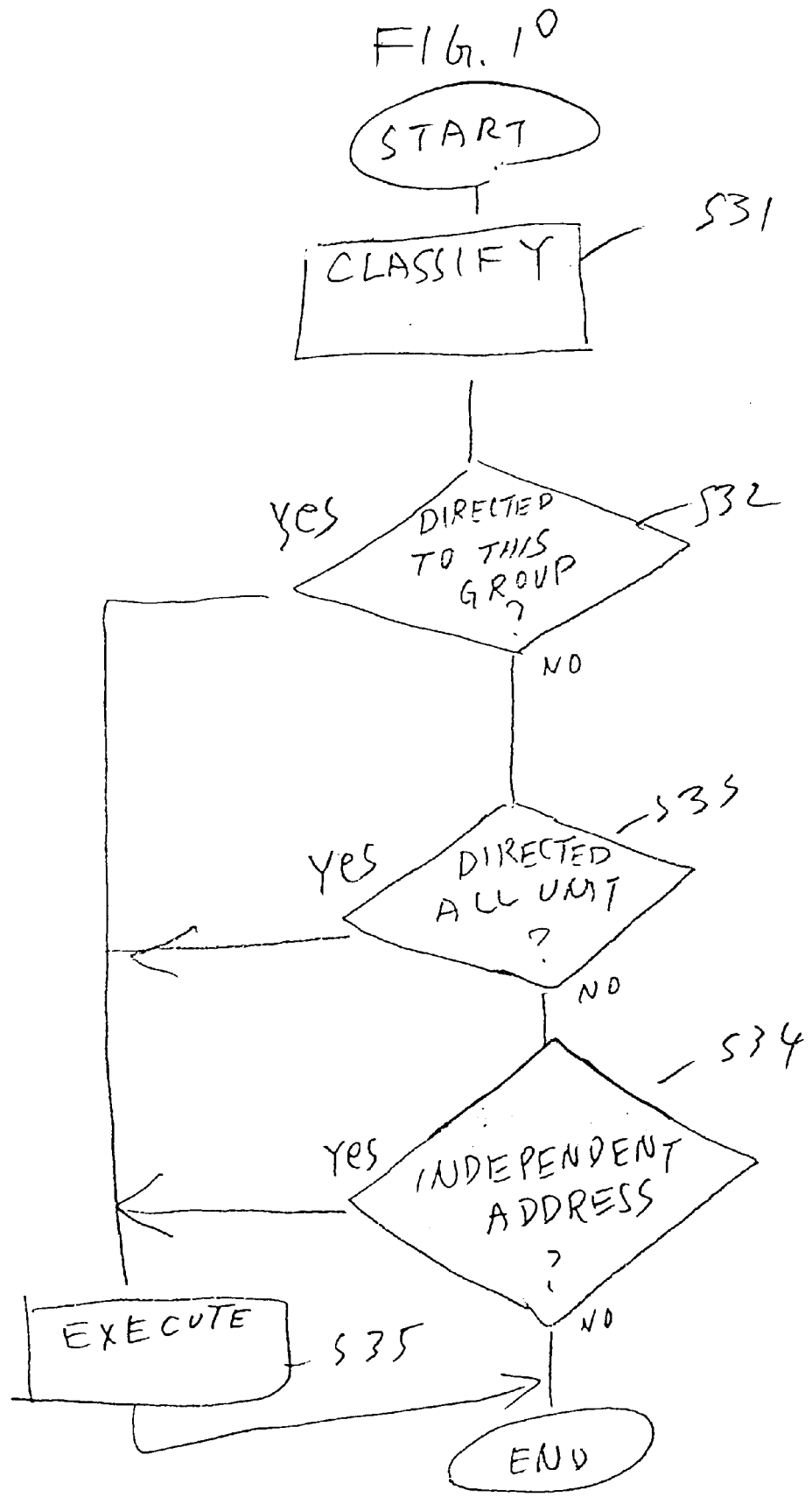

SECURITY SYSTEM

BACKGROUND OF THE INVENTION

1. Field of the Invention

This invention relates to a security system including a plurality of security units and a control unit coupled to the security units.

2. Description of the Prior Art

A security system including a plurality of security units and a control unit coupled to the security units is known.

FIG. 11 is a block diagram of a prior art security system including a plurality of monitoring cameras 31a to 31d and a control side. The control side includes a switcher 32, display monitors 33a and 33b, an image separating unit 34 for generating video signal including a plurality of images from the monitoring cameras 31a to 31d, a multi-image display monitor 35, a frame switcher 36, and a video signal recording unit 37, and a control unit 38.

SUMMARY OF THE INVENTION

The aim of the present invention is to provide a superior security system.

According to the present invention, a first aspect of the present invention provides a security system comprising: a plurality of security units; a plurality of control units coupled to said plurality of security units through a communication line including a transmission line; each of control unit including information transmitting means for transmitting a command including control data and address data to at least one of said security units through said transmission line in response to a transmission request; data collision detection means for detecting data collision on said transmission line, wherein said information transmitting means postpones transmitting said command for a predetermined interval when said data collision detection means detects said data collision on said transmission line.

A second aspect according to the present invention provides a security system based on the first aspect, further comprising: re-transmission interval setting means for setting said predetermined interval in response to a setting command.

A third aspect: according to the present invention provides a security system comprising: a plurality of security units; a plurality of control units coupled to said plurality of security units through a communication line including a transmission line; each of said control units including information transmitting means for transmitting a command including control data and address data to at least one of said security units through said transmission line in response to a transmission request; transmission line monitoring means for detecting said command transmitted from one of said control units other than this control unit; condition control means for storing conditional data of said security units in charge of this control unit, wherein when said command detected by said transmission line monitoring means is directed to one of said security units in charge of this control unit, said condition control means rewrites said conditional data of said one of said security units to equalize said conditional data of said one of said security unit to the condition of said one of said security unit in accordance with said command detected by said transmission line monitoring means.

A fourth aspect according to the present invention provides a security system comprising: a plurality of security units, each security units transmitting a command through a response line of a communication line; and a plurality of control units coupled to said plurality of security units through said communication line; each of said control units including: response line monitoring means for detecting said command transmitted from one of said security units; and condition control mans for storing conditional data of said security units in charge of this control unit, wherein when said command detected by said response line monitoring means is from one of said security units in charge of this control unit, said condition control means rewrites said conditional data of said one of said security units to equalize said conditional data of said one of said security unit to the condition of said one of said security unit in accordance with said command detected by said response line monitoring means.

A fifth aspect according to the present invention provides a security system comprising: a plurality of security units; and a plurality of control units coupled to said plurality of security units through a communication line including a transmission line; each of control unit including information transmitting means for transmitting a command including control data and address data to at least one of said control units other than this control unit through said transmission line in response to a transmission request; and transmission line monitoring means for detecting said command transmitted from one of said control units other than this control unit, wherein said transmission line monitoring means receives said command, when said command is directed to this control unit to provide bi-directional communication between said plurality of control units through said transmission line.

A sixth aspect according to the present invention provides a security system comprising: a plurality of security units, each of said security units transmitting a command through a response line of a communication line; and a plurality of control units coupled to said plurality of security units through said communication line; each security unit including: response line monitoring means for detecting said command transmitted from one of said security units, wherein said response line monitoring means receives said command, when said command is directed to this security unit to provide bi-directional communication between said plurality of security units through said response line.

A seventh aspect according to the present invention provides a security system based on the fifth aspect, wherein said each control unit further comprises: address data classifying means for classifying said address data received by said transmission lien monitoring means, wherein said transmission line monitoring means receives said command, when said address data in said command is directed to this control unit in accordance with result of said classifying means to provide multiple-address communication among all control units, group communication, and independent communication.

An eighths aspect provides a security system based on the sixth aspect, wherein said each security unit further comprises: address data classifying means for classifying said address data received by said response line monitoring means, wherein said response line monitoring means receives said command, when said address data in said command is directed to this security unit in accordance with result of said classifying means to provide multiple-address communication among all security units, group communication, and independent communication.

BRIEF DESCRIPTION OF THE DRAWINGS

The object and features of the present invention will become more readily apparent from the following detailed description taken in conjunction with the accompanying drawings in which:

FIGS. 5A to 5C are time charts in the control unit;

FIG. 7 is a table of retransmission interval according to the embodiment of the present invention;

The same or corresponding elements or parts are designated with like references throughout the drawings.

DETAILED DESCRIPTION OF THE INVENTION

Prior to describing an embodiment of the present invention, aspect of the present invention will be described further. This invention provides a combined security system including a plurality of security systems each including a plurality of security units and a control unit, the security systems communicate with each other through a communication line.

Hereinbelow will be described an embodiment of this invention.

Figure 1:
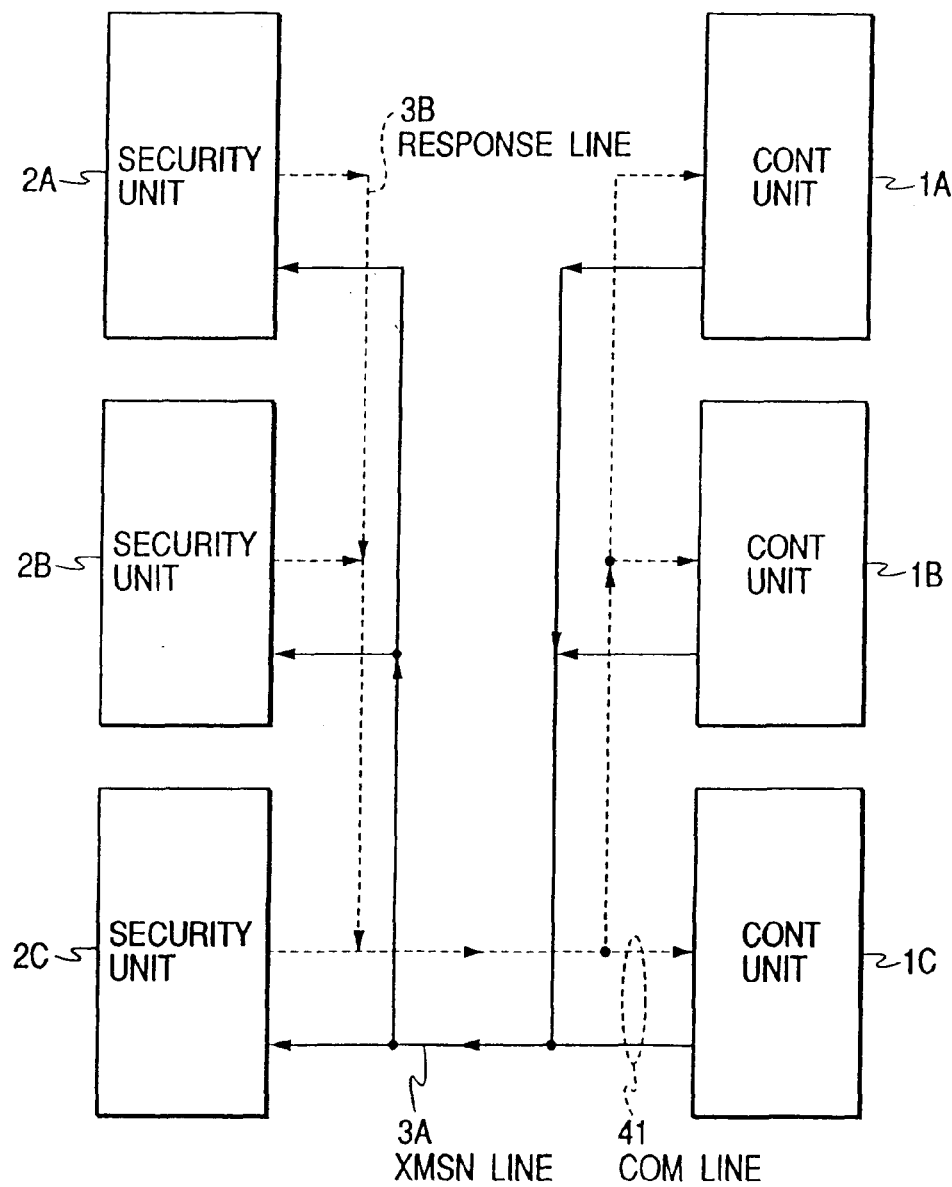
FIG. 1 is a block diagram of a security system according to an embodiment of the present invention.

FIG. 1 is a block diagram of a security system according to an embodiment of the present invention.

The security system of the embodiment includes a plurality of security units 2A to 2C and a plurality of control units 1A to 1C coupled to the security units 2A to 2C through a communication line including a transmission line 3A and a response line 3B.

The transmission line 3A is for transmitting a command from one of the control units 1A–1C. The response line 3B is for transmitting a command from one of the security units 2A to 2C.

Figure 2:
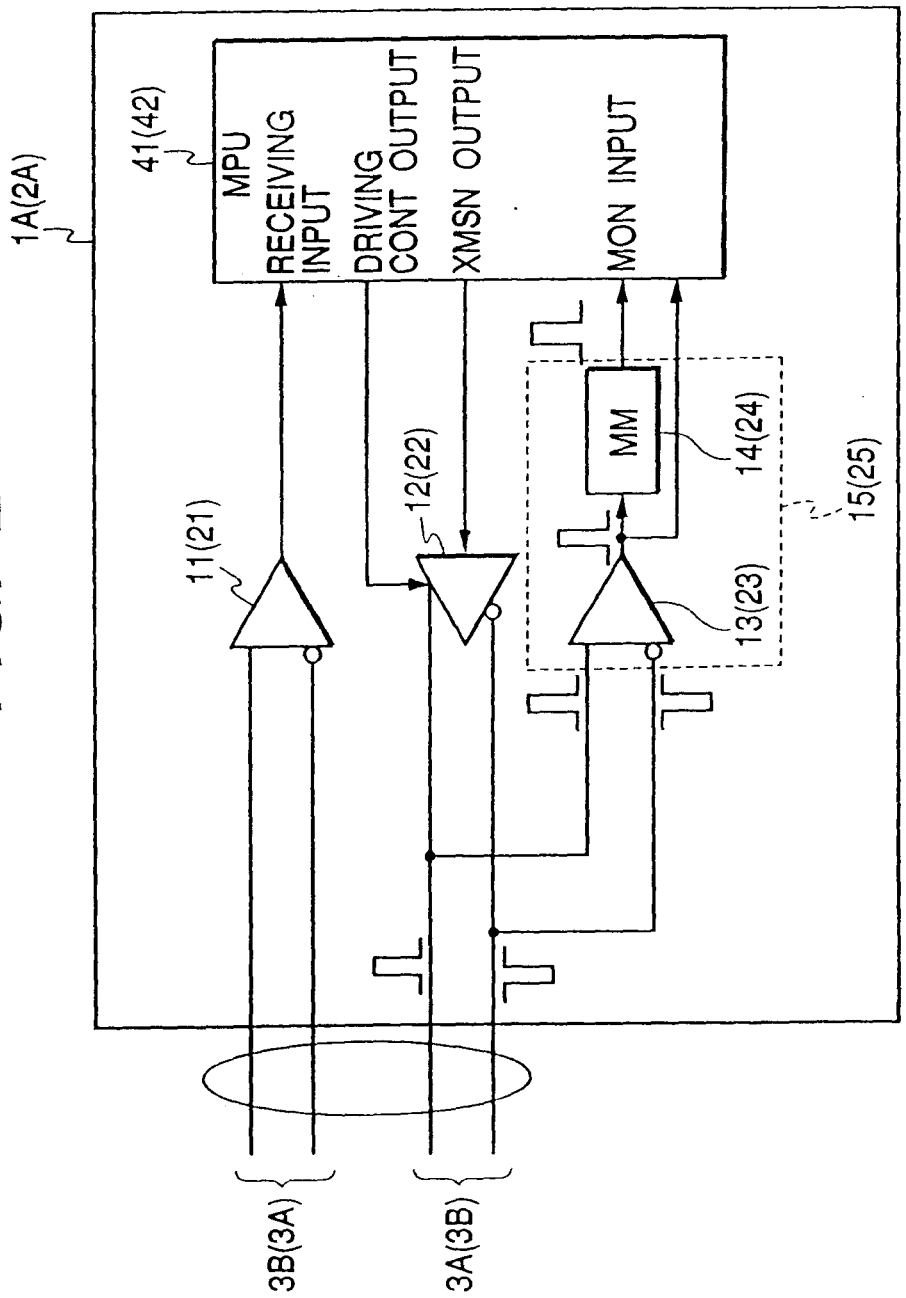
FIG. 2 is a block diagram of the control unit according to the embodiment of the present invention.

FIG. 2 is a block diagram of the control unit according to the embodiment of the present invention.

In the control unit 1A, the response line 3B is coupled to a receiving input of a microprocessor 41 through a receiver 11 and a transmission output of the microprocessor 41 is coupled to the transmission line 3A through a driver 12. The driver 12 is controlled in response to a drive signal from a driving control output of the microprocessor 41. The receiver 11 and the driver 12 provide a full duplex channel.

The transmission line 3A is coupled to a monitoring input of the microprocessor 41 through a receiver 13 and a monostable multivibrator 14. The receiver 13 and the monostable multivibrator 14 form a communication collision detection circuit 15. Other control units 1B and 1C have the same structure as the control unit 1A.

In FIG. 2, the references in parentheses represent those in the security unit. That is, the security unit 2A has substantially the same structure as the control unit 1A, wherein the transmission line 3A is coupled to the receiving input and the response line 3B is coupled to the transmission output. More specifically, the transmission line 3A is coupled to a receiving input of a microprocessor 42 of the security unit 2A through a receiver 21 and a transmission output of the microprocessor 42 is coupled to the response line 3B through a driver 22. The driver 22 is controlled in response to a driving signal from a driving control output of the microprocessor 42. The receiver 21 and the driver 22 provide a full duplex channel.

The response line 3B is coupled to a monitoring input of the microprocessor 42 through a receiver 23 and a monostable multivibrator 24. The receiver 23 and the monostable multivibrator 24 form a communication collision detection circuit 25. Other security units 2B and 2C have the same structure as the security unit 2A.

Figure 3:
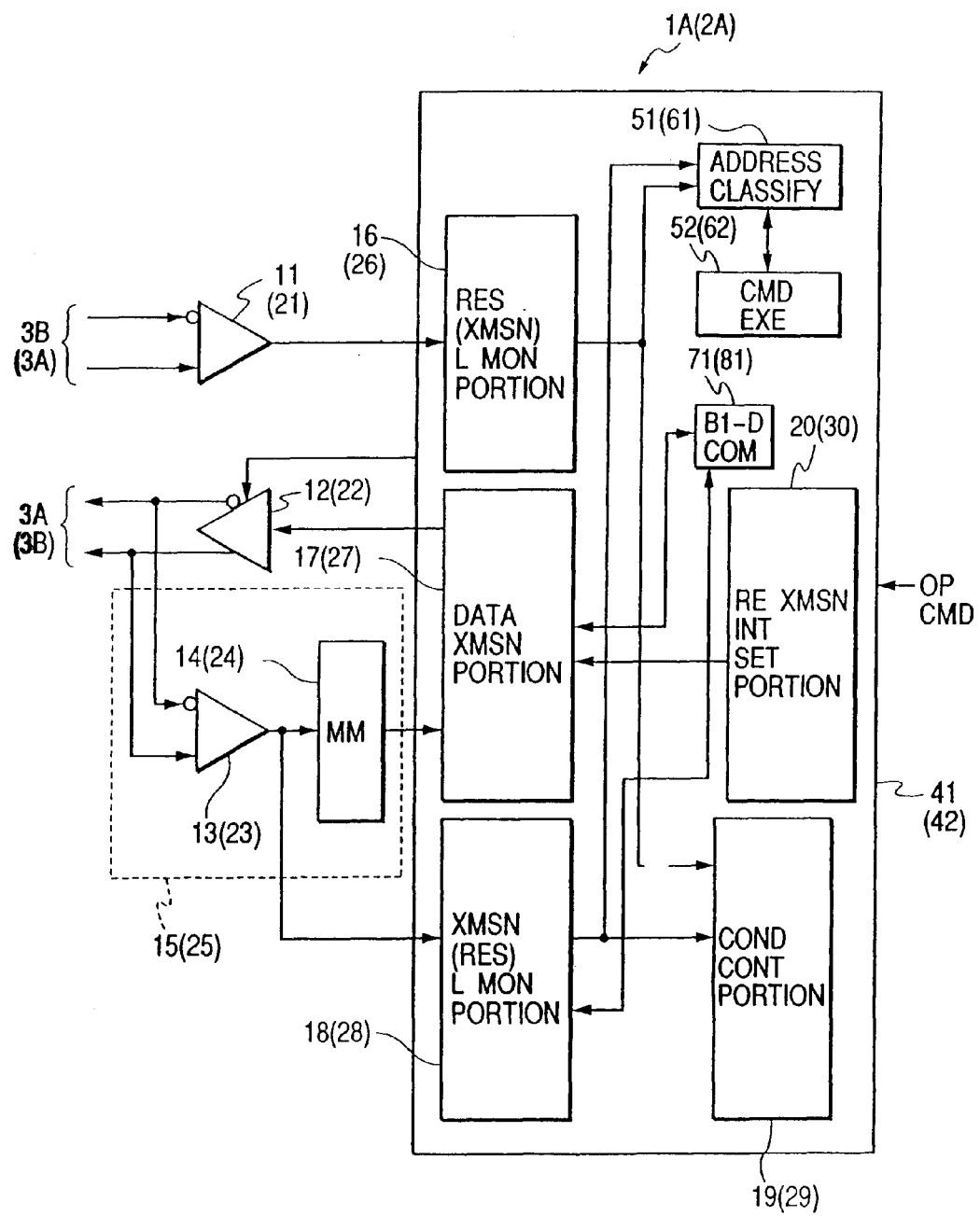
FIG. 3 is a detailed block diagram of the control unit and a security unit according to this embodiment.
Figure 4:
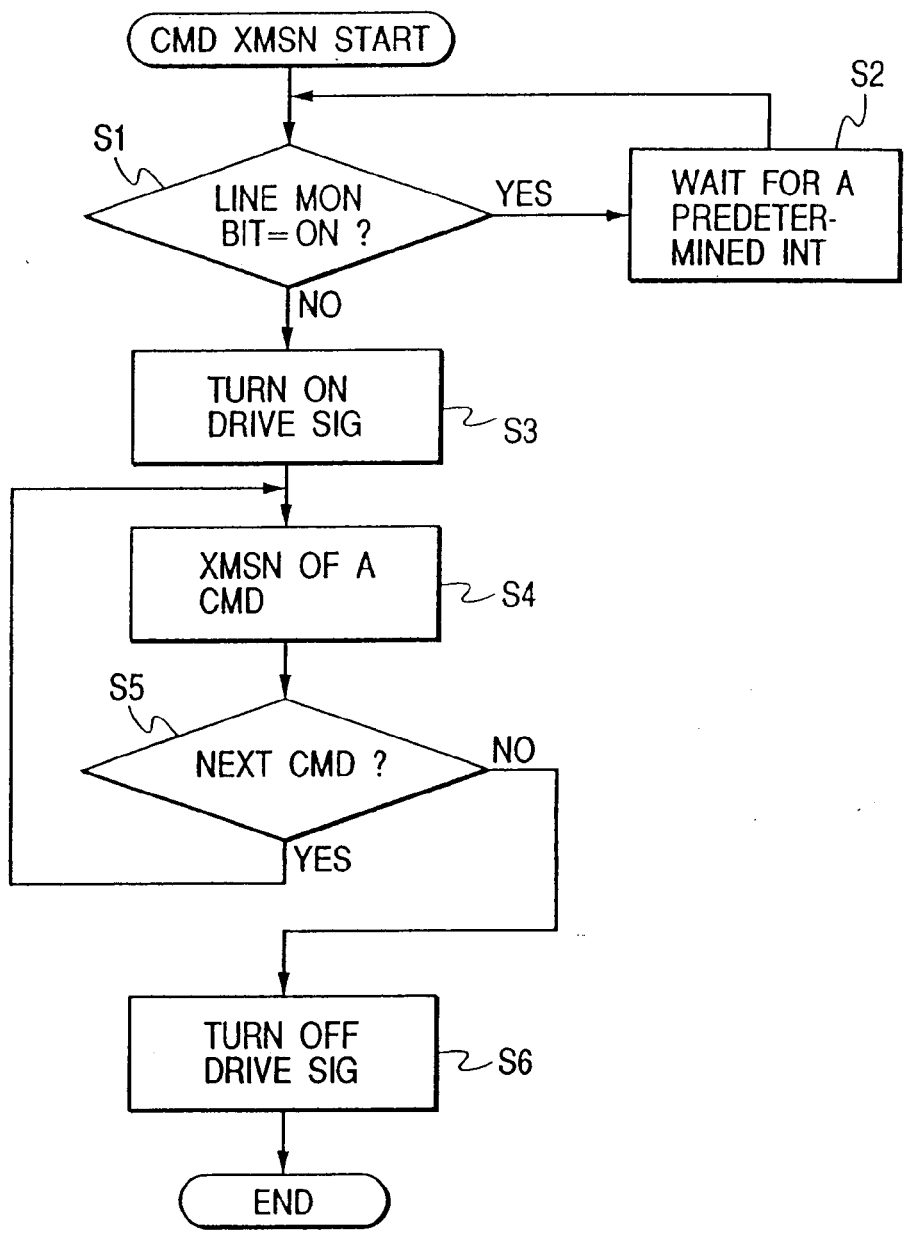

FIG. 3 is a detailed block diagram of the control unit 1A (a security unit 2A) according to this embodiment. The microprocessor 41 includes a response line monitoring portion (program) 16 for monitoring a command on the response line 3B, a data transmission portion 17 for transmitting data and for receiving a line monitoring bit from data collision detection circuit 15, a transmission line monitoring portion 18 for monitoring a command on the transmission line 3A, a condition control portion 19 for controlling condition of the security units to be controlled by this control unit in accordance the command received by the response line monitoring portion 16 and the transmission line monitoring portion 18, a re-transmission interval setting portion 20 for setting a re-transmitting interval of the command transmitted by the data transmission portion 17, an address classifying portion 51, and a command execution portion 52. Other control units 1B and 1C have the same structure.

In FIG. 3, the references in parentheses represent those in the security unit 2A. That is, the security unit 2A has substantially the same structure as the control unit 1A, wherein the transmission line 3A is coupled to the transmission line monitoring portion 26 and the response line 3B is coupled to the data transmission portion 27. More specifically, the microprocessor 42 of the security unit 2A includes the transmission line monitoring portion 26 for monitoring a command on the transmission line 3A, the data transmission portion 27 for transmitting data and for receiving a line monitoring bit from data collision detection circuit 25, a response line monitoring portion 28 for monitoring a command on the response line 3B, a condition control portion 29 for controlling condition of the control units in charge of this security unit 2A in accordance the command received by the transmission line monitoring portion 26 and the response line monitoring portion 28, a re-transmission interval setting portion 30 for setting a re-transmitting interval of the command transmitted by the data transmission portion 27, and an address classifying portion 61, and a command execution portion 62. Other security units 2B and 2C have the same structure.

Figure 4:
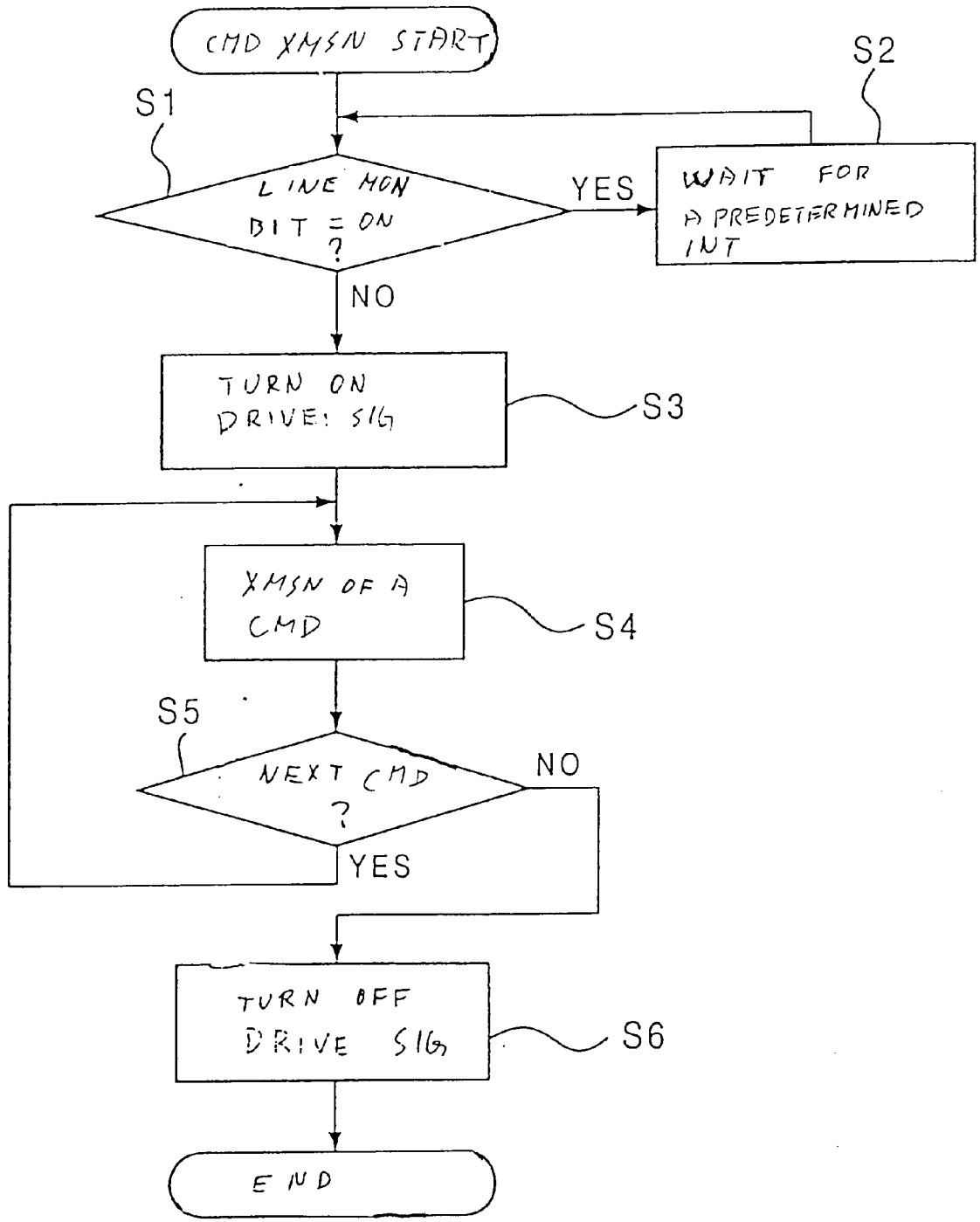
FIG. 4 depicts a flow chart of the control unit showing transmitting operation to the security unit.

FIG. 4 depicts a flow chart of the control unit 1A showing transmitting operation to the security unit 2A.

In response to an operation command including a transmission command, the control unit 1A executes command transmission operation. Then, the control unit 1A confirms that no command is transmitted on the transmission line 3A from other control unit 1B and 1C before transmitting a command. That is, the microprocessor 41 detects whether the line monitoring bit from the collision detection circuit 15 in step S1. When the line monitoring bit is ON, the microprocessor 41 waits for a predetermined interval (retransmission interval) in step S2. If the line monitoring bit is OFF ("0") in step S1, the microprocessor 41 makes the drive signal for the driver 12 "1" in step S3 and transmits a command in step S4. When transmission of the command has finished, the microprocessor 41 makes the drive signal "0", that is, the output of the driver 12 is made high impedance in step S6 and the microprocessor 41 ends the processing.

FIGS. 5A to 5C are time charts in the control unit 1A. The control unit 1A outputs the drive signal of "1" at timing t1 to the driver 12 if the line monitoring bit is OFF ("0")X. When the control unit 1A transmits a command at timing t2. The command includes a command starting byte, a destination address, a source address, and command data, a command end byte. During this the line monitoring bit is ON.

When the transmission of the command has finished at timing t3, the drive signal is made "0". On the other hand, the line monitoring bit is turned off at timing t4 which is after 10 ms from the timing t3. Thus, the control unit 1A occupies the transmission line 3A from the timing t1 to the timing t4.

Figures 6A, 6B, 6C:
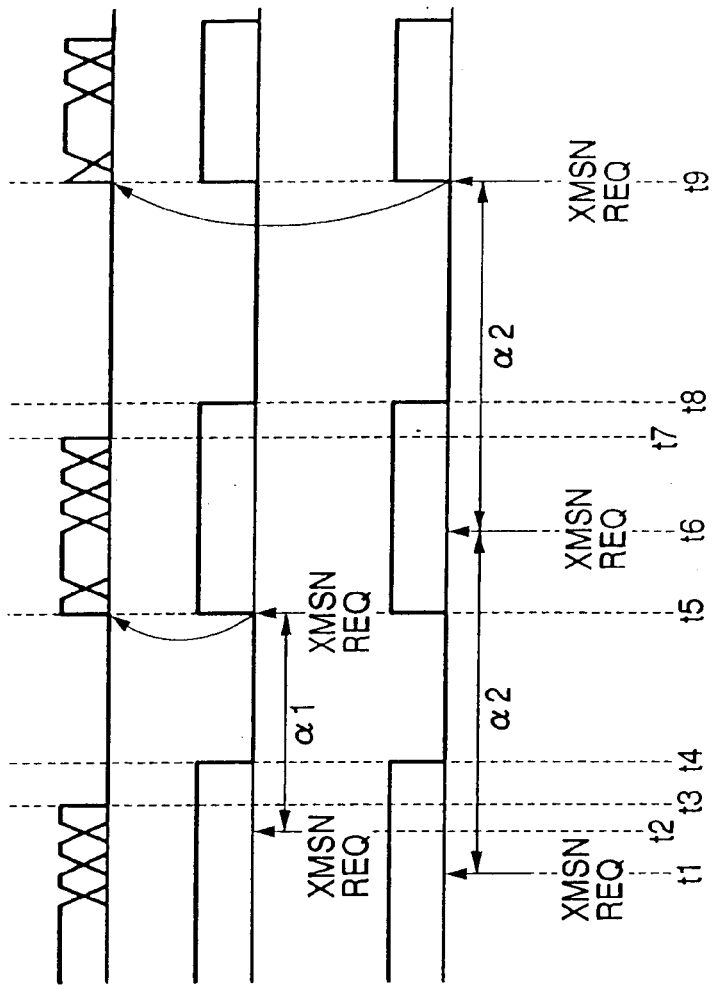
FIGS. 6A to 6C are timing charts of transmission of commands when two control units request transmission of commands at substantially the same time.
Figure 8:
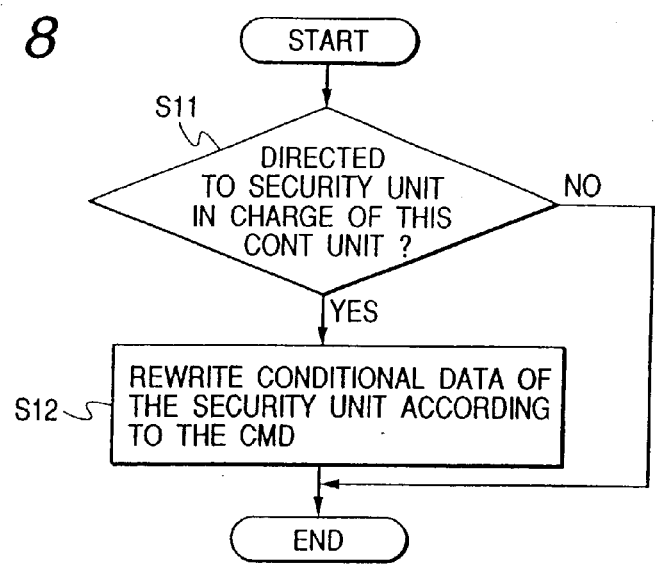
Figure 9:
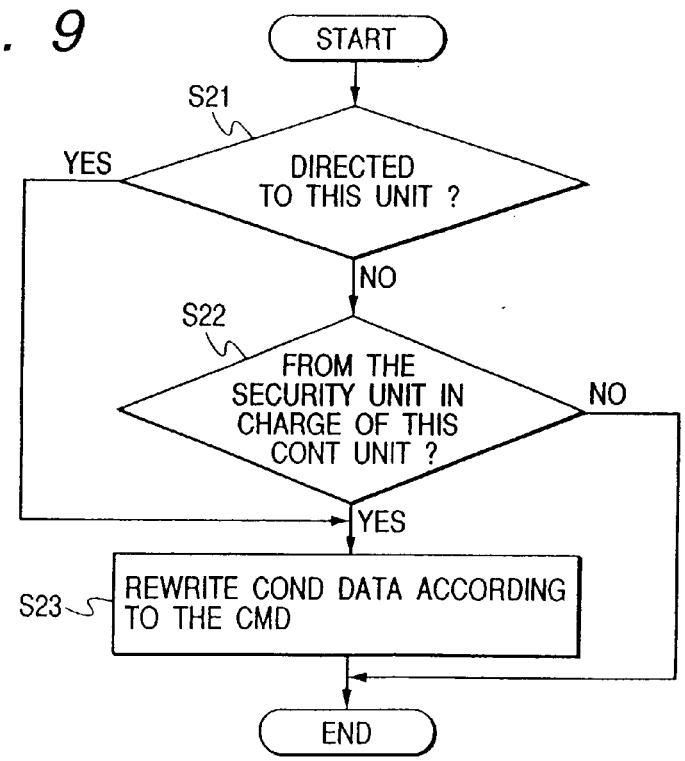

FIGS. 6A to 6C are timing charts of transmission of commands when both control units 1A and 1B request transmission of commands at substantially the same time.

On the transmission line 3A, there is a command up to timing t3 as shown in FIG. 6A. Then, if the control unit 1B requests at timing t1 as shown in FIG. 6C and the control unit 1A requests transmission at timing t2, these control units 1A and 1B wait for the next transmission request timings, respectively.

At timing t4, the line monitoring bits of the control units 1A and 1B are made "0". The control unit 1A transmits a transmission request again at timing t5 which is later by a retransmission interval α1 after the timing t2 and the control unit 1B transmits a transmission request again at timing t6 which is later by a retransmission interval α2 after the timing t1, wherein α1<α2.

When the control unit 1A transmits the transmission request at the timing t5, the control unit 1A can transmit the command because the transmission line 3A is released, that is, the line monitoring bit (1A) is "0" and there is no command from other control units.

When the control unit 1B transmits the transmission request at the timing t6, the control unit 1B cannot transmit the command because the transmission line 3A is not released, that is the line monitoring bit (1B) is "1" and there is the command from the control unit 1A.

Then, the control unit 1B waits again. At timing t7, transmission of the command from the control unit 1A has finished. Thus, the line monitoring bit (1B) is made "0" at timing t8 which is later the timing t7 by 10 ms, so that the transmission line 3A is released.

After the retransmission interval (α2 assigned to the control unit 1B from the timing t6, the control unit 1B transmits the transmission request at timing t9. Because the line monitoring bit (1B) is "0" at this timing, the control unit 1B can transmit the command on the transmission lien 3A.

As mentioned above, repetition of data collision is prevented. That is, the control unit loosing the first transmission timing transmits after a predetermined retransmission interval which is independently assigned to the control unit. This prevents data collision. The retransmission interval is set by the retransmission interval setting portion 20 in response to the operation command indicative of the setting the retransmission interval. The security units also avoid the data collision in the same manner.

FIG. 7 is a table of retransmission interval set by the retransmission interval setting portion 20.

The retransmission interval setting portion 20 sets in accordance with the least significant digit of the address data of the control unit for example. When the least significant digit of the address data is "1", the retransmission interval is set to 0 ms or no vertical synchronizing interval. If the least significant digit of the address data is "2", the retransmission interval is set to 5 ms or one vertical synchronizing interval. If the retransmission timing is determined by an internal timer of the control unit 1A, the retransmission timing is determined from either of 0 to 45 ms at an interval of 5 ms. If the retransmission timing is determined by vertical synchronizing interval generated or detected in the control unit 1A, the retransmission timing is determined from either of zero to nine vertical synchronizing intervals.

As mentioned above, the security unit 2A may be controlled by the other control unit. When the security unit 2A is controlled by the other control unit. The control unit in charge of the security unit 2A should know the changed condition of the security unit 2A. Then, the control units 1A to 1C monitor the command on the transmission line 3A transmitted by the other control unit with the transmission line monitoring portion 18. If the command is transmitted from another control unit to the security unit in charge of the control unit, the control unit rewrites the data in the conditional control portion 19 to equalize the conditional data in the condition control portion 19 to the condition of the security unit.

Figure 8:
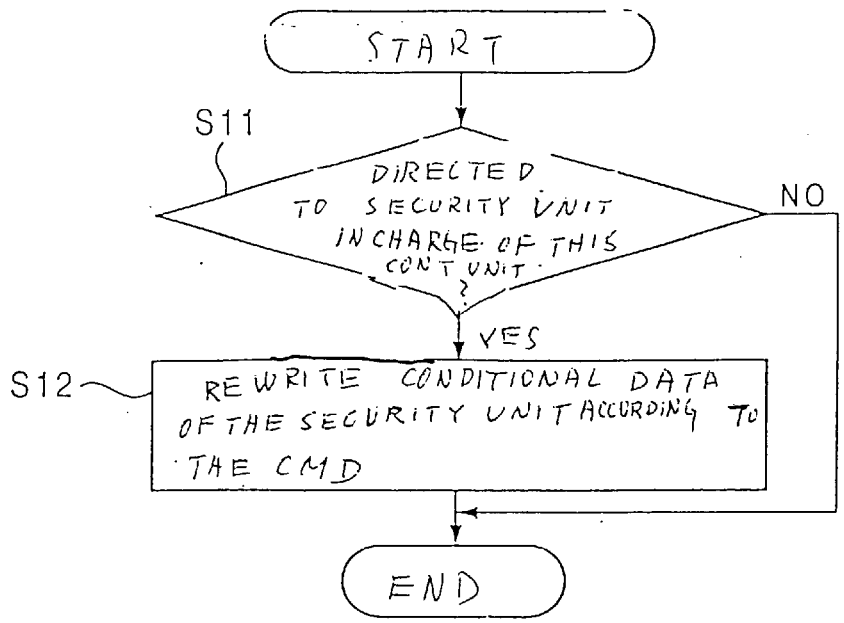
FIG. 8 depicts a flow chart of the line monitoring operation in the control unit.

FIG. 8 depicts a flow chart of the line monitoring operation in the control unit 1A. The transmission line monitoring portion 18 receives the command from another control unit and judges whether the command is directed to the security unit in charge of this control unit 1A in step S11. This is done by checking the destination address in the command. If the command is not directed to this control unit, processing ends. If the command is directed to any of the security units in charge of this control unit, the control unit rewrites the conditional data in the condition control portion 19 in step S12 and ends the processing.

Each of the control units 1A to 1C performs bi-directional communication with another control unit using the data transmission portion 17, the transmission line monitoring portion 18 for receiving the data under control of a bi-directional communication portion 71. For example, the bi-directional communication is used for copying the setting data or communication record data from one control unit to another control unit. Moreover, one control unit can control another control unit.

Moreover, each of the security units 2A to 2C performs bi-directional communication with another security unit using the data transmission portion 27, the transmission line monitoring portion 28 for receiving the data under control of a bi-directional communication portion 81. For example, the bi-directional communication is used for copying the setting data or communication record data from one control unit to another control unit. Moreover, one security unit can control another security unit. Further, if one security unit loose setting data due to a power fail for example, the security unit can copy the setting data from another security data in response to the power fail and power on for example.

Moreover, each of the control units 1A to 1C monitors the command transmitted from the security unit in charge of this control unit to other control units using the response line monitoring portion 16. If the command is transmitted from the security unit in charge of this control unit, the control unit rewrites the conditional data of the security unit in the condition control portion 19 to equalize the conditional data in the condition control portion 19 to the condition of the security unit.

Figure 9:
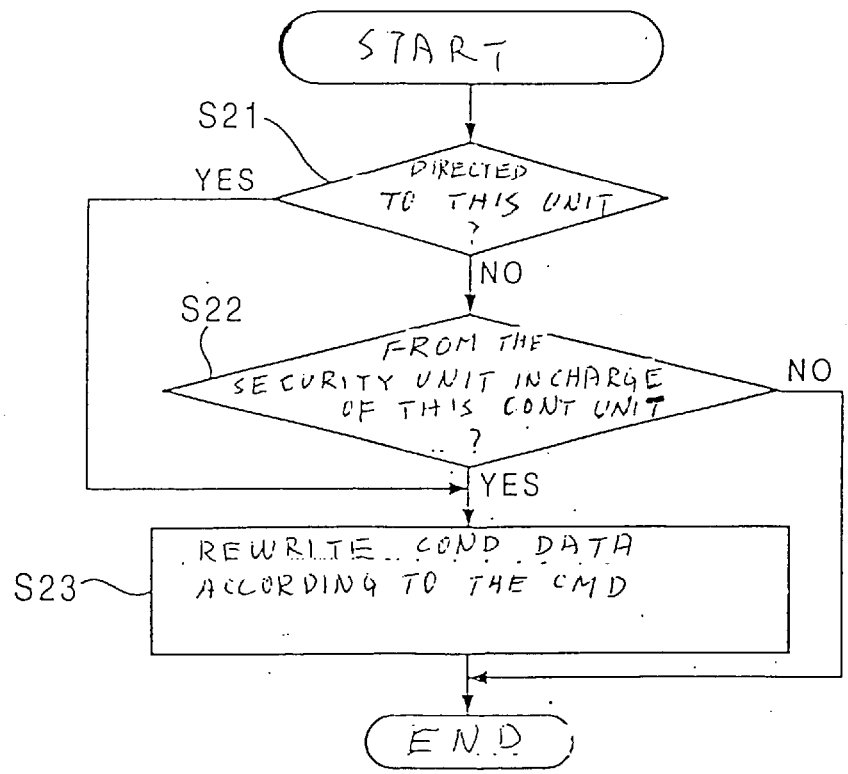
FIG. 9 depicts a flow chart showing the conditional data rewriting operation.
Figure 11:
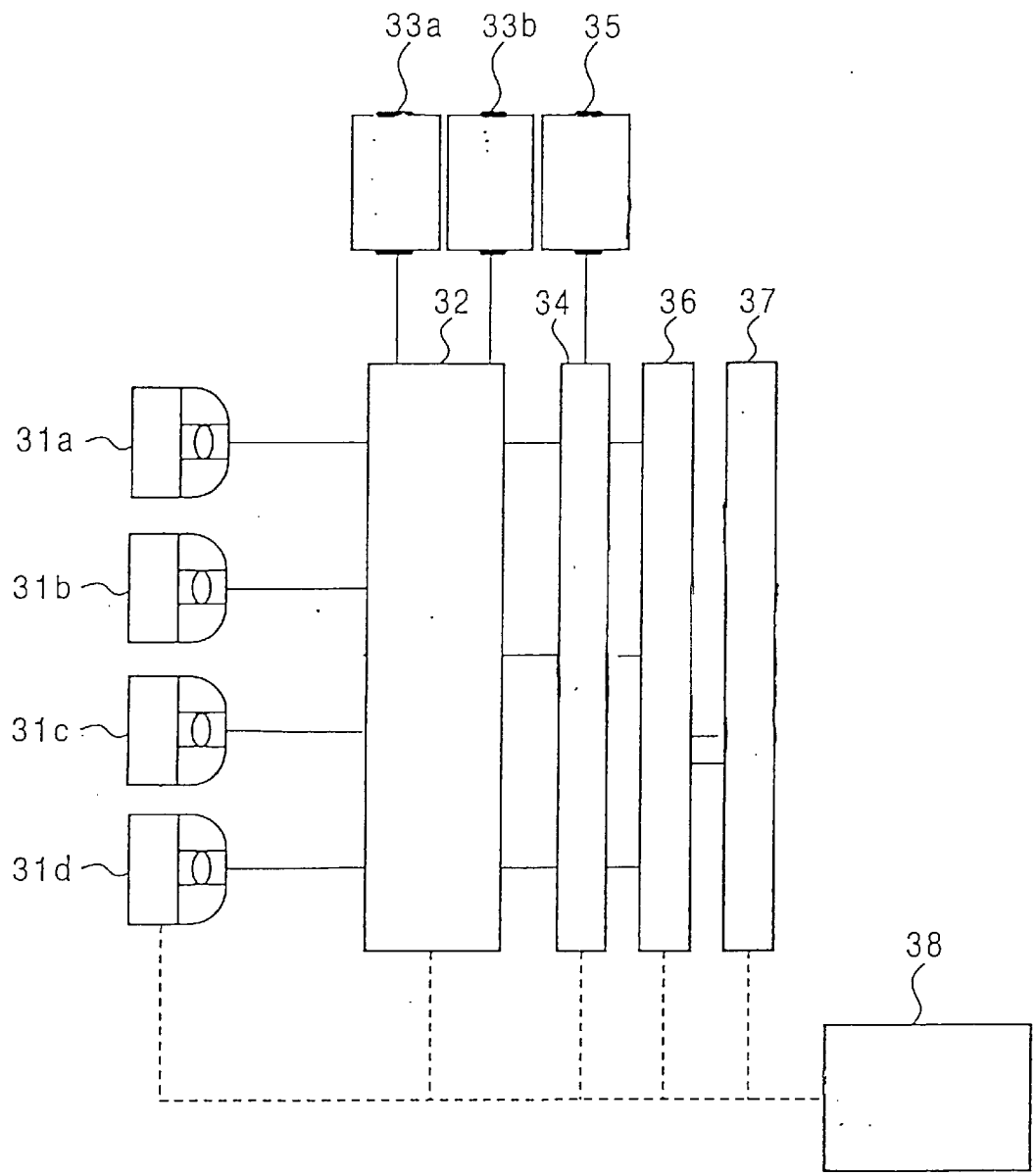
FIG. 11 is a block diagram of a prior art security system including a plurality of monitoring cameras and a control side.

FIG. 9 depicts a flow chart showing this operation. The control unit 1A receives a command transmitted from one of the security units 2A to 2C with the response line monitoring portion 16. The control unit 1A judges whether the command is directed to this control unit 1A in step S21 by checking the source address in the command. If the command is not directed to this control unit 1A, the control unit 1A judges whether the command is transmitted from one of the security units 2A to 2C in charge of this control unit 1A in step S22. If the command is not from one of the security units 2A to 2C in charge of this control unit 1A in step S22, processing ends.

If the command is directed to this control unit 1A in step S21 in step S21 or if the command is from one of the security units 2A to 2C in charge of this control unit in step S22, the control unit 1A rewrites the conditional data in the condition control portion 19 in step S23 and processing ends.

Moreover, each of the control units 1A to 1C can control all security units 2A to 2C at the same time with a special address in the transmitted command and each of the security units 2A to 2C can control all control units 1A to 1C with another special address in the transmitted command.

More specifically, the microprocessor 42 in each security unit judges whether the address in the received command on the transmission line 3A corresponds to the special address, if the address corresponds to the special address, the microprocessor 42 in the security unit responds the command though the address disagrees with the it own address.

Similarly, the microprocessor 41 in each control unit judges whether the address in the received command on the response line corresponds to another special address. If the address corresponds to the special address, the microprocessor 41 in the control unit responds the command though the address disagrees with its own address using the command execution portions 52.

Further, the control units 1A to 1C and the security units 2A to 2C are grouped and group addresses are assigned to the groups.

More specifically, the microprocessor 42 in each security unit judges whether the address in the received command on the transmission line corresponds to the group address to which this security unit belongs, if the address corresponds to the assigned address, the microprocessor 42 in the security unit responds the command though the address disagrees with the it own address.

Similarly, the microprocessor 41 in each control unit judges whether the address in the received command on the response line 3B corresponds to the group address. If the address corresponds to the group address, the microprocessor 41 in the control unit responds the command though the address disagrees with it own address using the command execution portion 52.

These special addresses are detected by classifying the address data by the address classifying portion 51. For example, the most significant digit of the address data is 0, the address data is directed to one of the control units 1A to 1C and the security units 2A to 2C. If the most significant digit of the address data is 1, the address data is directed to all security units 2A to 2C. If the most significant digit of the address data is 2, the address data is directed to all control units 1A to 1C.

If the most significant digit of the address data is 3, the address data is directed to one group of the security units 2A to 2C. Then, each of the security units 2A to 2C checks the lower digits in the address data and if the lower digits in the address data corresponds to the group address to which the security unit belongs, the security unit responds the command.

If the most significant digit of the address data is 4, the address data is directed to one group of the control units 1A to 1C. Then, each of the control units 1A to 1C checks the lower digits in the address data and if the lower digits in the address data corresponds to the group address to which the control unit belongs, the control unit responds the command.

Accordingly, a group of the security units can be controlled to turn on or to release the alarm setting.

If the most significant digit of the address data is "0", the command is directed to a single unit, so that a single security unit can be independently controlled and one signal control unit can be independently controlled. Thus, only one specific security unit can be controlled to turn on or release the alarm setting.

Figure 10:
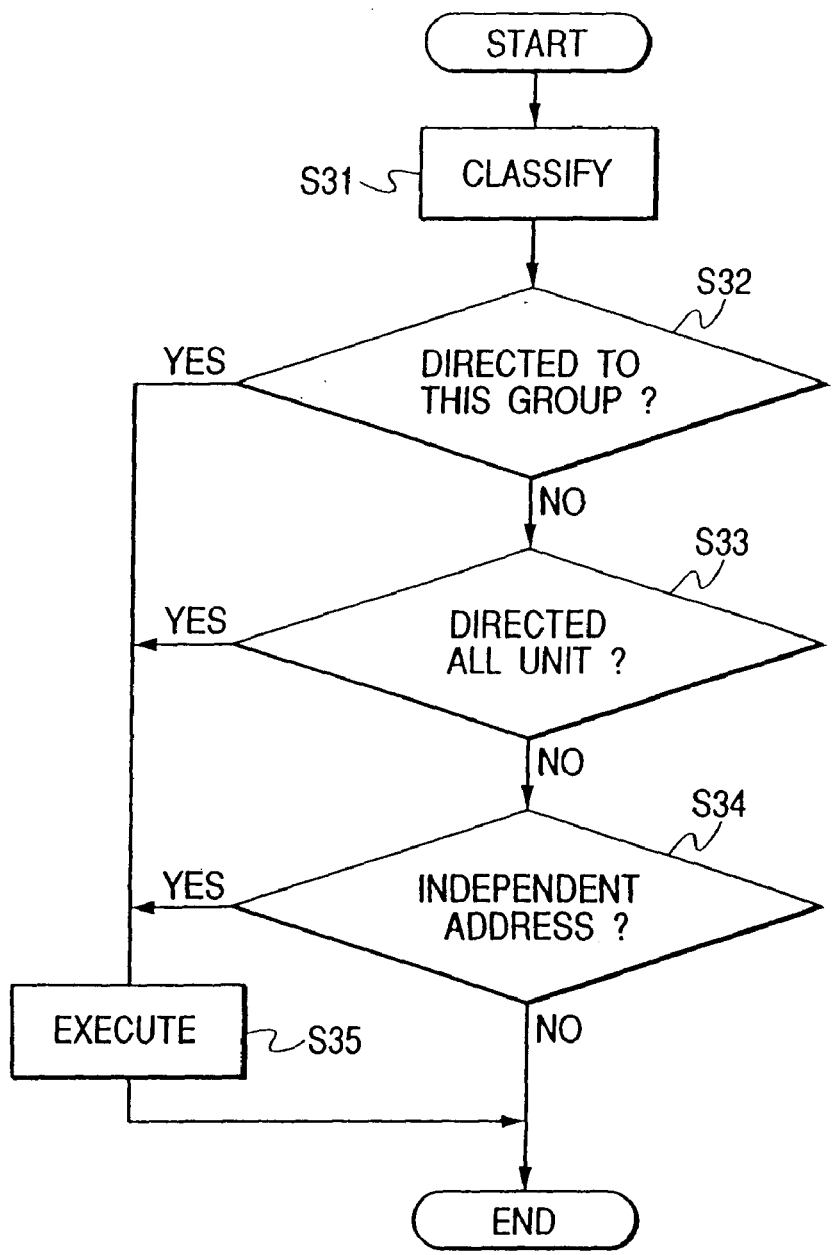
FIG. 10 depicts a flow chart of address data classifying operation according to this embodiment.
Figure 11:
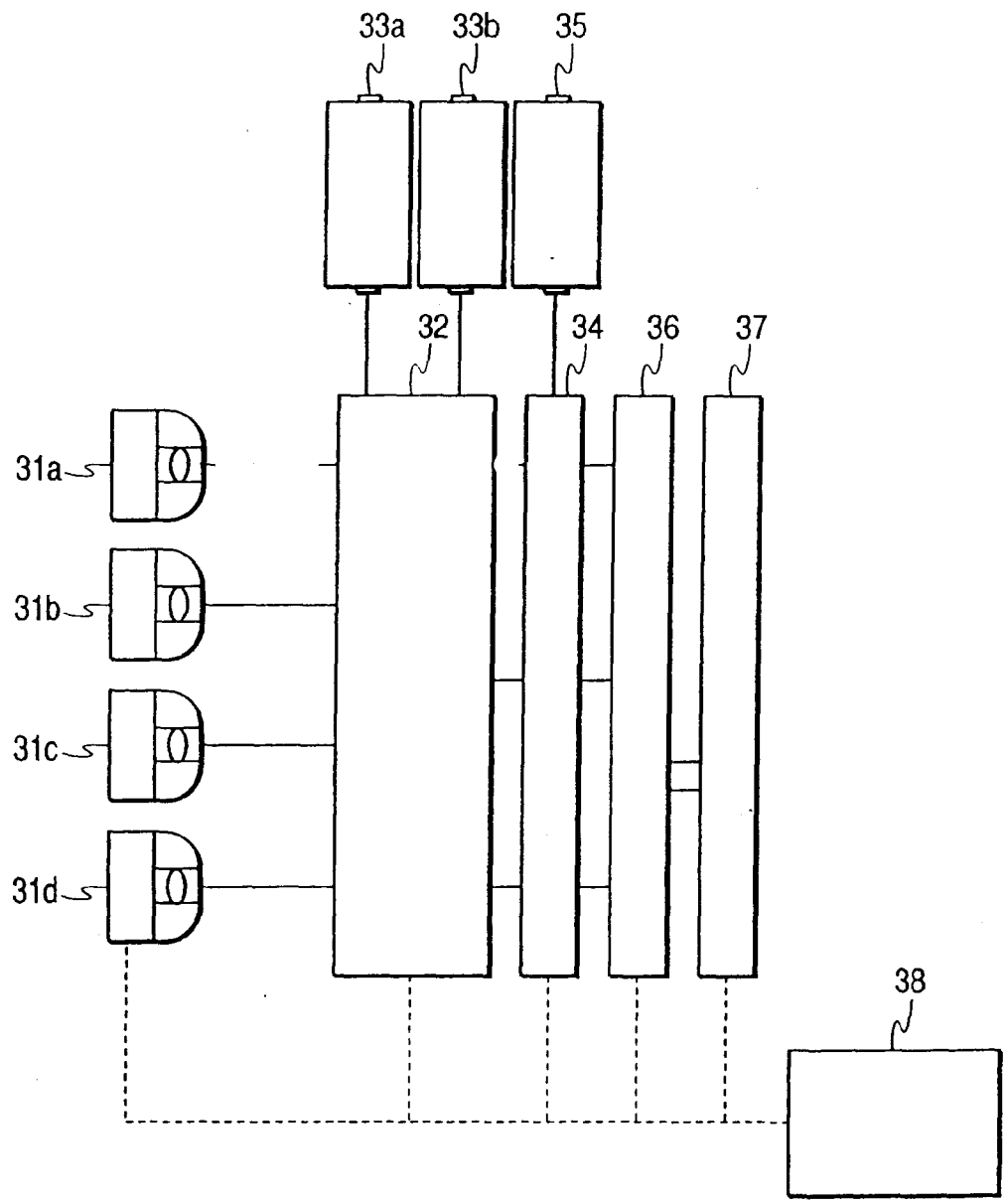

FIG. 10 shows the address data classifying operation of the control units 1A to 1C and the security units 2A to 2C.

The microprocessor 42 (41) of the security unit (control unit) classifies the address data in step S31. If the address data is classified to a group address in step S32, processing proceeds to step S35. If the address data is classified to the all unit address (multiple-address) in step S33, processing proceeds to step S35. If the address data is classified to an independent address in step S34, processing proceeds to step S35.

In step S35, the microprocessor 42(41) of the security unit (control unit) executes the control data in the command with the command execution portion 52 (62).

This invention is applicable to a security system including a single security unit and a plurality of control units, a security system including a plurality of the security units and a single control unit, and a security system including a single security unit and a single control unit. Moreover, the address data may include the most significant digit value directed to another system other than this security system. In that case, no control units and no security unit in this security system does not respond the command including that value in the most significant bit in the address data. Thus, the security unit or the control unit in this security system can control other units in the other system.

What is claimed is:

1. A security system comprising:
   a plurality of security units; and
   a plurality of control units connected to said plurality of security units through a communication line including a transmission line;
   each of control units including:
   information transmitting means for transmitting a command including control data and address data to at least one of said security units through said transmission line in response to a transmission request;
   data collision detection means for detecting data collision on said transmission line, wherein said information transmitting means postpones transmission of said command when said collision detection means detects data collision on said transmission line;

re-transmission interval setting means for setting a different interval for each of said control units; and information transmitting means for re-transmitting said command after the elapse of said different interval set by said retransmission interval setting means from the detection of said data collision.

2. The security system according to claim 1, wherein each of said control units further includes transmission line monitoring means for detecting said command transmitted from one of said control units and condition control means for storing condition data of said security units, wherein when said command detected by said transmission line monitoring means is directed to one of said security units in charge of said each control unit, said condition control means rewrites said condition data of said one security unit to equalize said condition data of said one security unit to a condition of said one security unit in accordance with said command by said transmission line monitoring means.

3. The security system according to claim 1, wherein said communication line further includes a response line so that each of said security units transmits a command through said response line of said communication line, and each of said control units further includes response line monitoring means for detecting said command on said response line transmitted from one of said security units and condition control means for storing condition data of said one security unit in charge of said each control unit, wherein said command detected by said response line monitoring means is from said one security unit in charge of said each control unit, said condition control means rewrites said condition data of said one security unit in accordance with said command detected by said response line monitoring means to equalize said condition data of said one security unit to a condition of said one security unit.

4. The security system according to claim 1, wherein each of said control units further includes transmission line monitoring means for detecting said command transmitted from one of said control units other than said each control unit, and said transmission line monitoring means receives said command when said command is directed to said each control unit to make bidirectional communications among said plurality of control units through said transmission line.

5. The security system according to claim 1, wherein said communication line further includes a response line so that each of said security units transmits a command through said response line of said communication line, and each of said security units includes response line monitoring means for detecting said command transmitted from one of said security units, said response line monitoring means receives said command when said command is directed to said each security unit to make bi-directional communications among said plurality of security units through said response line.

6. The security system according to claim 5, wherein each of said control units and each of said security units are made to control address data to be added to said commands so that each of said control units controls all said security units simultaneously while each of said security units controls all said control units simultaneously.

7. The security system according to claim 6, wherein each of said control units and each of said security units further include address data classifying means for classifying said address data so that each of said control units controls said security units simultaneously in unit of group while each of said security units controls said control units simultaneously in unit of group.

\* \* \* \* \*

UNITED STATES PATENT AND TRADEMARK OFFICE
CERTIFICATE OF CORRECTION

PATENT NO. : 6,838,974 B2
APPLICATION NO. : 09/748162
DATED : January 4, 2005
INVENTOR(S) : Kazuhisa Tsuzuki, Motohiro Misawa and Tooru Toyoda It is certified that error appears in the above-identified patent and that said Letters Patent is hereby corrected as shown below:

Replace 10 Drawing Sheets (Figs. 1-11) with the attached Formal Drawings.

Col. 5, line 17, delete "When the" and insert therefor --The--;

line 19, delete "and" and after "data," insert --and--;

line 20, after "this" insert --transmission--;

line 56, after "later" insert --than--;

line 65, delete "loosing" and insert therefor --losing--.

Signed and Sealed this

Nineteenth Day of September, 2006

JON W. DUDAS
*Director of the United States Patent and Trademark Office*

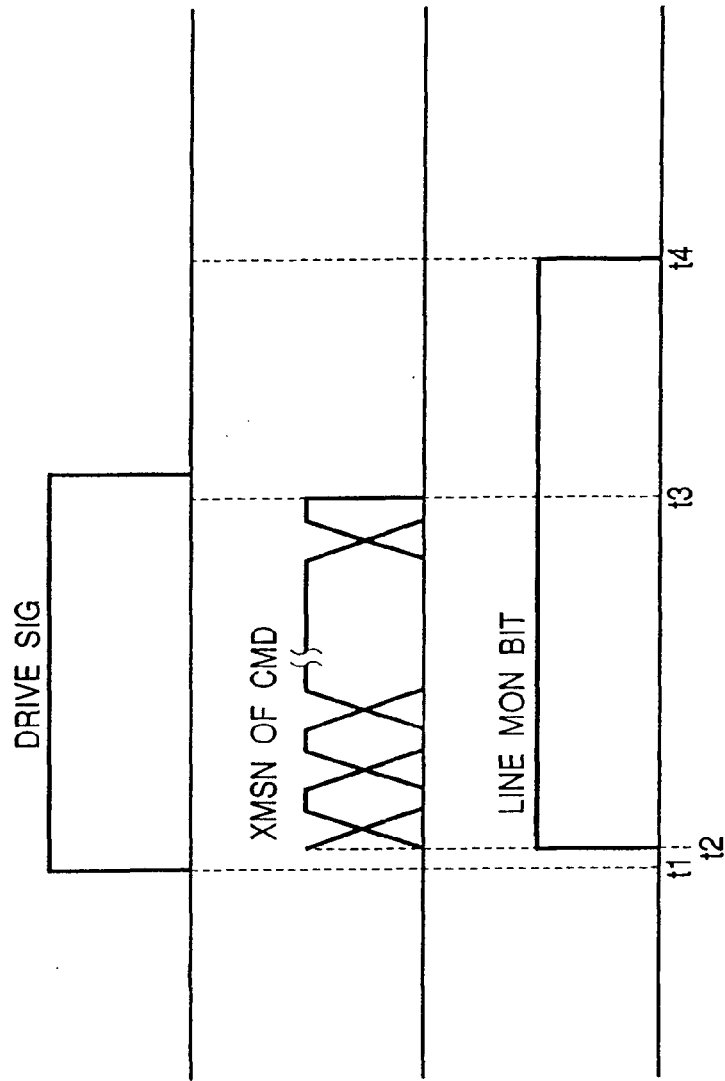

FIG. 7

| ADDRESS (L·SD) | α (ms) | |
| --- | --- | --- |
| | INTERNAL TIMER | V SYNC |
| 1 | 0ms | 0V SYNC |
| 2 | 5ms | 1V SYNC |
| 3 | 10ms | 2V SYNC |
| 4 | 15ms | 3V SYNC |
| 5 | 20ms | 4V SYNC |
| 6 | 25ms | 5V SYNC |
| 7 | 30ms | 6V SYNC |
| 8 | 35ms | 7V SYNC |
| 9 | 40ms | 8V SYNC |
| 0 | 42ms | 9V SYNC |